Patented June 21, 1927.

1,633,337

UNITED STATES PATENT OFFICE.

FELIX LAUTER, OF PHILADELPHIA, PENNSYLVANIA, ASSIGNOR TO ROHM & HAAS COMPANY, A CORPORATION OF DELAWARE.

RESINOUS REACTION PRODUCT OF UREA AND FORMALDEHYDE.

No Drawing. Application filed July 28, 1925. Serial No. 46,659.

Many reaction products of formaldehyde and a carbamide such as urea have frequently been made, but these have had substantially no commercial application because they were either water-soluble or could be made partly water-insoluble only by such a long-drawn out process as to render the products too expensive for commercial application.

I have found that substantially water-insoluble products can be made from formaldehyde and a carbamide by the addition of proper ingredients at the time the reaction is carried on. This may be done either by the addition of an alcohol having two hydroxyl radicals or the esters of such alcohol, or by carrying on the reaction in the presence of a commercial solvent such as alcohol, benzol, toluol, acetone, carbon tetrachloride, or the like, in place of water. If desired, the two steps can be combined.

In the title of this application and the claims, I refer to the product as being "resinous". In using this term, I have in mind the superficial appearance of the product and not its physical characteristics, for my product is a true colloid and not a resin.

The use of glycerine or other polyhydric alcohol as a medium, in the presence of which the carbamide and formaldehyde are condensed, not only serves to render the final product water-proof, but also assists in making it flexible, thus enabling me to produce a reaction product which can be used for photographic films and many other purposes. It is recognized that glycerine has frequently been suggested as a material to be added to resinous substances of the general character here described, but heretofore it has been added after the first reaction has taken place and a resinous body has been formed. I have discovered that by having the glycerine or other polyhydric alcohol present at the time of the original reaction, a new effect is obtained. It may be that the result is due to the fact that there is a mixture of two colloids and that the glycerine serves as a dispersing agent surrounding and protecting each molecule of the resin-like material.

I have so far secured the best results by using 2.7 molecules of formaldehyde to each molecule of urea and an additional molecule of formaldehyde for each molecule of glycerine; however, the proportion of glycerine used should be such that not more than 1.2 molecules of glycerine are used for one molecule of urea. These proportions are not, however, absolute, but they may be modified to suit the wishes of the operator.

The condensation may be carried on without the addition of any condensing agents, but I prefer to use either an acid or an alkaline condensing agent, or under certain conditions to use first one and then the other. The material, after the preliminary condensation, may be molded or cast into desired form and then hardened under heat, with pressure if desired, or the intermediate product may be used as a water-proof lacquer or varnish.

When producing a water-proof product without the use of glycerine or an equivalent material, I dissolve the formaldehyde, together with a material which will render the solution alkaline, in an ordinary commercial solvent such as alcohol, benzol, acetone, carbon tetrachloride, or the like, avoiding the addition of water. The simplest way to accomplish this is to use the formaldehyde in its polymerized form as paraformaldehyde, or if desired, I may use hexamethylenetetramine, which will itself serve to render the solution alkaline.

After the formaldehyde, in such form as it may be used, is dissolved, if any iron or other material has been precipitated out, the solution can be filtered. Crystals of urea or other carbamide can then be added, or they may first be dissolved in the same solvent as was used for the formaldehyde. The mixture is then boiled until condensation takes place. An additional catalyst (either acid or basic) may then be used, depending on the end product to be made, and the boiling is continued until the desired consistency is reached. If the material is to be used as a lacquer, a certain amount of the solvent will ordinarily be allowed to remain, or it may be thickened beyond the point where it is to be used for a lacquer and stored in closed containers and then can be thinned out again by the use of added quantities of the original solvent used. If desired, all of the solvent can be driven out by the use of heat and a hard final product may be obtained. The final hardening may be carried on under pressure, so that a molded product may be produced. The solvent driven out can of course be recovered and re-used.

If the two stages are to be combined, the glycerine or other polyhydric alcohol or ester is preferably added to the solution of the carbamide and formaldehyde prior to the time when the condensation takes place. As in the first instance mentioned, it is again preferable to use not more than 1.2 molecules of glycerine to one molecule of urea.

I find this product, combining the two features, to be particularly advantageous for use as a strong and flexible material, similar to celluloid, which can be stamped out cold or which can, in a liquid state, be used as a lacquer or varnish for metal. After hardening with heat, the lacquer will stand a considerable amount of bending and stamping without breaking off from the metal.

For the purposes of illustration only, the following examples are given:

*Example 1.*—399 grams of commercial solution of formaldehyde are heated to boiling point and a solution of 30 grams of glycerine and 100 grams of urea are added; then 2 cc. of concentrated nitric acid ($HNO_3$) are incorporated and boiled until condensation takes place. After the condensation, 20 cc. of ammonium hydroxide ($NH_4OH$) are added and boiled until the material will harden on cooling. The product separated from residual water is shaped and dried at a temperature of about 60° which may gradually be increased to about 125° if necessary. The resulting product will be found to be water white, insoluble in water or alcohol, strong and flexible. Among other uses, it will be found useful for photographic and optical purposes.

*Example 2.*—415 grams of commercial formaldehyde solution, 50 grams of glycerine, 100 grams of urea, 2 cc. of $HNO_3$ and 20 cc. of $NH_4OH$ are prepared in a manner similar to that set forth for Example No. 1. This product is specially adapted for use as a lacquer for impregnation.

*Example 3.*—383 grams of commercial formaldehyde solution, 10 grams of glycerine, 100 grams of urea, 3 cc. of $HNO_3$ and 10 cc. of $NH_4OH$ are prepared in a manner similar to that set forth for Example No. 1. This product is specially adapted for use for casting purposes.

*Example 4.*—435 grams of commercial formaldehyde solution, 75 grams of glycerine, 100 grams of urea and 10 grams of ammonium nitrate ($NH_4NO_3$) are prepared in a manner similar to that set forth for Example No. 1. This product is adapted for use in molding compounds.

*Example 5.*—140 cc. $CH_3OH$ and 30 cc. $NH_4OH$ are mixed and 138.5 grams of paraformaldehyde are dissolved in same; if necessary filter mass and heat to boiling point, then add 100 grams urea crystals and condense to wanted consistency. To produce a hard product, all the solvent is driven off and the material dried with heat; if a lacquer is to be produced, some solvent is allowed to remain.

*Example 6.*—150 cc. acetone and 30 cc. $NH_4OH$ are mixed and 138.5 grams paraformaldehyde are dissolved in same, then filtered and heated to boiling point. 100 grams of urea crystals are dissolved in 150 cc. acetone, filtered and then added to the boiling mixture; after condensation takes place, add 2 cc. $HNO_3$ and let mass boil for about 20 minutes; then 20 cc. $NH_4OH$ are added. If a thicker consistency is wanted, the surplus of acetone is distilled off, until necessary stage is reached. The condensation product can be kept in a closed container and partly or as a whole later thinned with acetone or dried and hardened under heat, and if wanted molded under pressure and heat.

*Example 7.*—160 cc. $C_2H_5OH$ and 30 cc. $NH_4OH$ are mixed and 144.5 grams paraformaldehyde are dissolved in same, then filtered. The mixture is then heated to the boiling point and 100 grams of urea crystals and 20 grams of glycerine are added; after condensation takes place, add 2 cc. $HNO_3$ and let mass boil until desired consistency is attained.

Within the term "urea" I intend to include equivalents such as thiourea or substitution products of thiourea or urea, and the term "polyhydric alcohol" is intended to include equivalent esters.

What I claim is:

1. The process of producing resinous reaction products, which comprises the step of causing a condensation to take place between urea and formaldehyde in the presence of a polyhydric alcohol.

2. A process as defined in claim 1, in which the polyhydric alcohol is glycerine.

3. A process as defined in claim 1, in which the polyhydric alcohol is glycerine, present in the proportion of not more than 1.2 molecules of glycerine to one molecule of urea.

4. The process of producing resinous reaction products of urea and an aldehyde, which comprises the step of reacting on the urea with an aldehyde in the presence of glycerine and a solvent, substantially no water being present.

5. The process of producing resinous reaction products of urea and an aldehyde, which comprises the step of reacting on the urea with an aldehyde in the presence of a solvent, substantially no water being present.

6. The process of producing resinous reaction products of urea and an aldehyde, which comprises the step of reacting on the urea with an aldehyde in the presence of a solvent which has been rendered alkaline, substantially no water being present.

7. A new product comprising a resinous reaction product of urea and an aldehyde in the presence of a polyhydric alcohol.

8. A new product comprising a resinous reaction product of urea and an aldehyde in the presence of glycerine.

9. A new product comprising a resinous reaction product of urea and an aldehyde in the presence of a non-aqueous medium.

10. A new product comprising a resinous reaction product of urea and a non-aqueous solution of an aldehyde.

FELIX LAUTER.